United States Patent [19]

Toulhoat et al.

[11] Patent Number: 4,537,875

[45] Date of Patent: Aug. 27, 1985

[54] CRUSHED CATALYSTS CONTAINING ALUMINA, SILICA OR SILICA-ALUMINA, AND PROCESS FOR THEIR MANUFACTURE

[75] Inventors: Hervé Toulhoat, Le Pecq; Jean-Claude Plumail, Le Vesinet; Marc Mercier, Ales; Yves Jacquin, Sevres, all of France

[73] Assignee: Societe Francaise des Produits pour Catalyse Pro-Catalyse, Rueil-Malmaison, France

[21] Appl. No.: 565,557

[22] Filed: Dec. 27, 1983

[30] Foreign Application Priority Data

Dec. 24, 1982 [FR] France ............................. 82 21854

[51] Int. Cl.³ .......................................... B01J 29/10
[52] U.S. Cl. ................................. 502/314; 502/248; 502/254; 502/259; 502/260; 502/263; 502/312; 502/313; 502/315; 502/316; 502/332; 502/335; 502/336; 502/354; 502/355; 208/217; 208/251 H; 208/254 H

[58] Field of Search ............... 502/246, 254, 258, 323, 502/305, 311, 313, 248, 259, 260, 263, 312, 315, 316, 332, 335, 336, 354, 355

[56] References Cited

U.S. PATENT DOCUMENTS

| | | | |
|---|---|---|---|
| 3,162,607 | 12/1964 | Burbidge et al. | 502/305 |
| 3,206,391 | 9/1965 | Gutberlet et al. | 502/246 |
| 4,081,405 | 3/1978 | Sawyer | 502/254 |
| 4,212,771 | 7/1980 | Hamner | 502/254 |
| 4,289,653 | 9/1981 | Jaffe | 502/254 |
| 4,410,450 | 10/1983 | Sasaki et al. | 502/305 |

*Primary Examiner*—D. E. Gantz
*Assistant Examiner*—Anthony McFarlane
*Attorney, Agent, or Firm*—Millen & White

[57] ABSTRACT

Alumina, silica or silica-alumina containing catalysts are manufactured by incorporating at least one active element selected from the metals of the groups V, VI and VIII or their compounds to a carrier, and then drying and activating. The carrier or the catalyst is shaped into extrudates and the latter are crushed to coarse particles.

9 Claims, 5 Drawing Figures

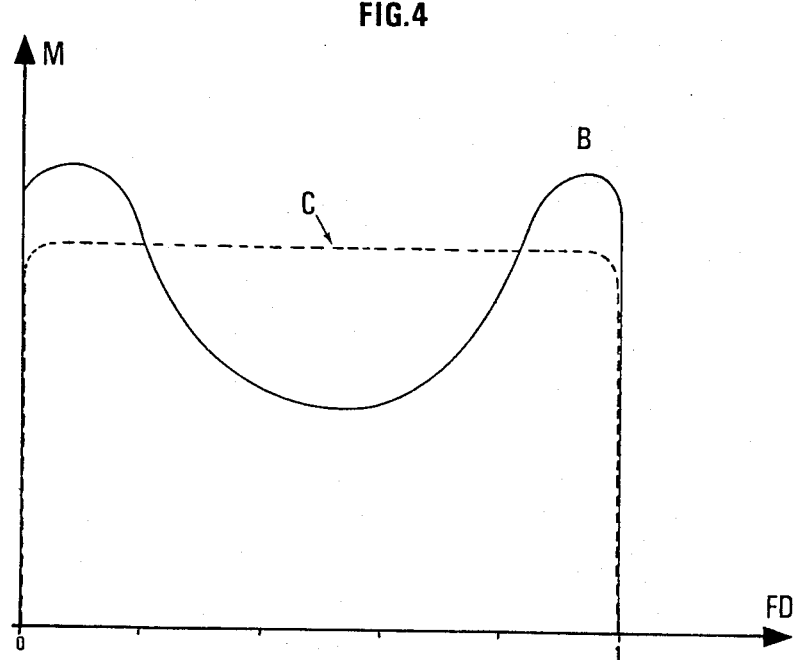

CRUSHED CATALYSTS CONTAINING ALUMINA, SILICA OR SILICA-ALUMINA, AND PROCESS FOR THEIR MANUFACTURE

BACKGROUND OF THE INVENTION

The invention relates to alumina, silica or silica-alumina containing catalysts, their manufacture and their use, particularly for the hydrotreatment of hydrocarbon oils, mainly those derived from oil or oil fractions or from coal hydrogenation products.

The catalysts mostly used in the field of hydrorefining of oil or oil fractions comprise a carrier such as alumina, silica or silica-alumina and at least one metal or compound of a metal from groups V and/or VI and/or VIII, in particular vanadium, molybdenum, tungsten, nickel, cobalt and/or one or more noble metals. The alumina (or silica) may be pure or contain additional components, depending on the considered use, for example alkali or alkaline-earth metals, rare earth metals, silica (or alumina), magnesia, thoria, halogen, in a proportion up to 10%, sometimes 30% or more. For sake of simplification, any of these materials will be called "carrier material" in the following disclosure.

These catalysts may have various shapes such as powder particles, spherical or ovoid balls, extrudates of circular or polylobal section, or pellets. For use as fixed, moving or expanded bed, the extrudates are usually of a diameter from 0.8 to 3 mm.

Extrudates may be manufactured in a manner well known in the art by passing a moist paste of carrier material, optionally with additional porogenous agents well known in the art, through calibrated orifices.

The extrudates are then "matured", i.e. kept in humid atmosphere, at moderate temperature, for example at about 60° to about 100° C., then dried at about 100° to 200° C. and calcined at about 300° to 1000° C. (activation treatment):

The calcined extrudates can then be used as catalyst carrier: they are impregnated with a solution of catalytic elements or their precursors. However, the catalytic elements or their precursors can be introduced into the moist paste of carrier material and the resultant mixture can be subjected to the above-mentioned operations of shaping, drying and calcination at about 300° to 1000° C.

For various applications, when the extrudates contain alumina, it may be advantageous to subject the extrudates, after calcination, to a subsequent treatment with water or steam, called "autoclaving", at a temperature from about 80° C. to about 300° C. for about 5 minutes to 48 hours, preferably from 1 to 6 hours.

The autoclaving aqueous medium preferably comprises at least one acid able to dissolve at least a portion of the alumina conglomerates, or the mixture of such an acid with at least one compound supplying an anion able to combine with aluminum ions, for example a mixture of nitric acid and acetic or formic acid.

The extrudates from the autoclaving step are then dried and activated by heating at a temperature of about 300° to 1000° C.

The above-mentioned autoclaving technique is described, for example, in the French Pat. No. 2,496,631.

When using autoclaving, the catalytic materials or their precursors may be introduced either before the extrusion of the carrier material or after the calcination performed after said extrusion, as already indicated above, or preferably after the autoclaving treatment and the subsequent thermal activation. In this latter case, after introduction of the catalytic elements, the resultant product is dried and calcined at 300°–1000° C. and/or reduced, according to known techniques.

The resultant extrudates usually have a surface from 50 to 350 m$^2$/g, preferably from 100 to 250 m$^2$/g, and a total pore volume from 0.4 to 1.5 cc/g, preferably from 0.8 to 1.2 cc/g.

The autoclaving treatment and/or the thermal treatments modify the structure of alumina, silica and/or silica-alumina and the characteristics thereof, particularly the specific surface and the porosity, this modification being useful for certain catalytic uses, particularly hydrorefining. More particularly, the autoclaving treatment, mainly when performed in acid medium, confers to the alumina-containing hydrorefining catalysts of the above-described type an exceptional resistance to poisoning by metals and/or asphaltenes deposition.

The catalysts of the invention are particularly useful in the domain of hydrotreatment (hydrodesulfuration, hydrodenitrogenation, hydrocracking, hydrometallation) of hydrocarbon oils containing metals and asphaltenes, for example crude oil, straight-run or vacuum distillation residues, deasphalted residues, bituminous sands or shales extracts, coal liquefiates.

These catalysts also have numerous other applications, for example in reforming of gasoline and naphtha, hydrogenation of unsaturated compounds and treatment of exhaust gases from internal combustion engines.

SUMMARY OF THE INVENTION

A treatment has now been discovered which provides for a substantial improvement of the activity and the life time of silica or alumina containing extrudate catalysts, either subjected or not to autoclaving in acid medium. This treatment consists of roughly crushing the extrudates so as to obtain particles of an average size (i.e. the mean value between the smaller size and the greater size) ranging from 0.5 to 4 mm, preferably from 0.8 to 2 mm. Too small particles, for example of an average size smaller than 0.5 mm, are discarded when the expected use of the catalyst is as fixed, moving or expanded bed; these small particles are, on the contrary, useful in processes operated with a catalyst dispersed in the liquid phase.

DETAILED DESCRIPTION

The crushing treatment may be applied either to extrudates of the catalyst itself, i.e. extrudates which already contain all or part of the catalytic elements, or to extrudates of the carrier material which do not yet contain—or only contain a part of—the catalytic elements. This latter method is preferred since it leads to more active catalysts; in this case, the crushed extrudate particles are subjected to impregnation with the catalytic elements, drying and final calcination.

In order to obtain particles of the required size, it is preferable to start with extrudates of a substantial diameter, for example from 4 mm to 10 mm.

The crushing of the extrudates is so effected as to obtain crushed catalyst particles with a ratio of their average size to the diameter of the starting extrudates of at least 0.05 and at most 0.5.

The crushed catalyst size may be measured on a sample representative thereof by using a series of sieves. The maximum size is that of the thinnest sieve mesh leaving passage to at least 90% by weight of the crushed sample. The minimum size is that of the largest sieve mesh retaining at least 90% by weight of the crushed sample.

The crushing may be effected with any apparatus known in the art such as a jaw crusher, a ball breaker or a roller crusher.

A Moritz roller crusher is preferably used, with one or two passages therethrough, depending on the initial diameter of the extrudates. The spacing between the two rollers is adjusted in relation with the diameter of the extrudates to be crushed. When proceeding in two passages, the spacing for the first passage is preferably identical to the diameter of the extrudates to be crushed. For the second passage, the spacing is adjusted to the maximum size of the particles to be obtained. Thus, when a catalyst of size from 0.5 to 1.5 mm is desired, the crushing may be effected, for example, as follows:

when the initial catalyst is of small diameter, for example 1.5 mm, the jaws are adjusted at 1.5 mm and a single passage is performed;

when the initial catalyst has a relatively large diameter, for example 4 mm, the spacing between the jaws is adjusted to 4 mm for the first passage and to 1.5 mm for the second passage.

BRIEF DESCRIPTION OF THE DRAWINGS

The invention is illustrated by FIGS. 1A, 1B, 2, 3 and 4.

FIGS. 2 to 4 represent the vanadium and nickel metal contents of catalyst samples, determined by scanning microscopy.

Figure 1A:
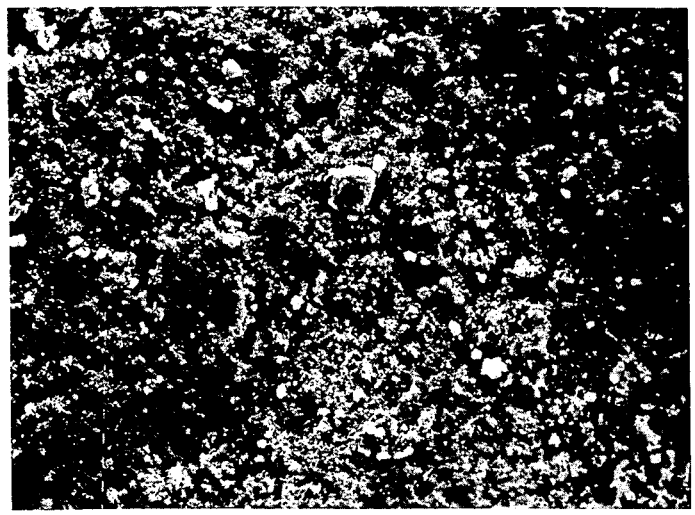
FIGS. 1A and 1B show photographs with a 600 times enlargement, of the external surface of alumina particles.
Figure 1B:
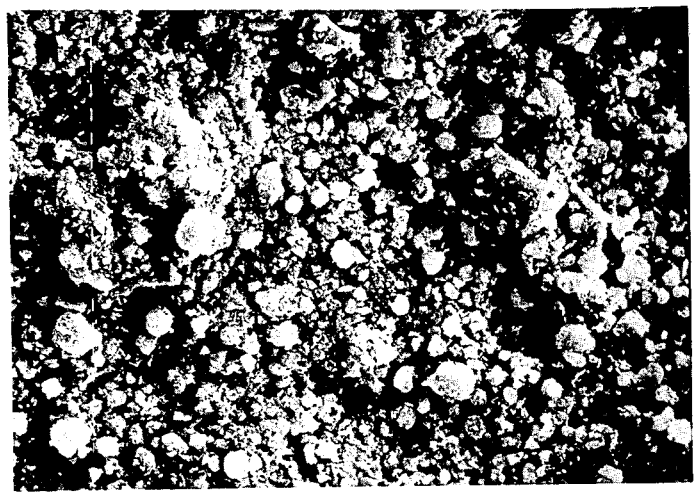

The scanning electron microscopy has given an explanation, to a certain extent, of the advantageous effect, resulting from crushing, on the activity and the life time of the catalysts: as a matter of fact, the photographs (enlargement 600) of an alumina extrudate show that the breaking surface of an alumina extrudate (FIG. 1B) has numerous pores which make access of the reactants easy whereas the pores of the external cylindrical surface of the extrudate (FIG. 1A) are relatively plugged. This surface plugging seems to increase in proportion to the number of treatments applied to the extrudates in the course of their manufacture. Thus, it is more substantial for "autoclaved" alumina extrudates than for the same extrudates before "autoclaving".

By way of example, the present process is particularly successful with the catalysts disclosed in allowed U.S. patent application No. 505,557 filed June 17, 1983. In these catalysts, alumina is in the form of conglomerates of acicular plates, the plates of each conglomerate being generally radially oriented with respect to one another and with respect to the center of the conglomerate, and forming a major proportion of wedge-shaped mesopores. The catalysts already have a high resistance to poisoning by pore-plugging with solid deposits of various nature: not only asphaltenes and metals or metal compounds from the charge when present therein, but also coke, sodium chloride, clay in suspension, particles resulting from catalyst attrition, this list being not limitative. The present process still increases the resistance to poisoning of the catalysts of the above-mentioned U.S. patent application.

When using catalysts of the invention to hydrorefine impure hydrocarbon oils, either directly or indirectly issued from oil, coal or other sources, advantageous operating conditons are as follows: temperature from 370° to 470° C., pressure from 50 to 300 bars, oil velocity of 0.2 to 5 volumes per volume of catalyst and per hour. The hydrogen gas/oil ratio by volume is usually from 20 to 500 normal liters per liter.

EXAMPLE 1

Two catalysts A and B are prepared by impregnation, respectively from carriers A1 and B1.

Carrier A1 is obtained by extrusion of an alumina gel through perforations of 1.6 mm diameter. The extrudates are cut to a length of 6 mm. They are then dried, calcined and subjected to autoclaving as above described.

Carrier B1 is obtained by extrusion of the same alumina gel through perforations of 5 mm diameter. The extrudates are cut to a length of 10 mm.

After drying and calcination, autoclaving is effected as for carrier A 1 and extrudates B 1 are crushed in two steps, the spacing of the crusher rollers being first 5 mm and then 2 mm. By sieving, only the particles of an average size from 1.2 to 2 mm are kept for impregnation.

Impregnation

Catalyst A is prepared as follows: 85 g of ammonium heptamolybdate are dissolved into 340 cc of distilled water by heating at 60° C. Separately, 58 g of nickel nitrate are dissolved into 340 cc of distilled water at room temperature. The two resultant solutions are admixed and the total volume of the mixture is brought to 1110 cc by addition of water at 25° C. This solution is immediately contacted with 1 kg of carrier A 1. The resultant carrier is maintained in humid atmosphere for 12 hours. Then the resultant catalyst is dried in a dry air stream at 110° C., then calcined for 2 hours at 500° C. in a revolving furnace.

Catalyst B is prepared by the same method from 1 kg of carrier B1.

Thus, for catalysts A and B, the chemical nature of alumina is exactly the same and the average size of the catalyst particles is also the same. It is also apparent that both catalysts have the same specific surface (measured by the so-called BET method by nitrogen adsorption), the same total pore volume, the same particle density (0.80) and the same structural density (3.30). The only difference is in the shape of the particles. The surface is 160 m²/g and the total pore volume 97 cc/100 g.

The chemical composition of the catalysts is as follows:
$Al_2O_3$ = 91.5% by weight
$MoO_3$ = 7.0% by weight
$NiO$ = 1.5% by weight The even distribution of the metals deposited on the carriers is checked by the Castaing microsonde method in scanning electron microscopy (Cameca sonde).

These two catalysts are tested in a unit with a traversed fixed bed. The catalyst volume is 1000 cc. The operating conditions are as follows:
Temperature: variable (see table 1)
Total pressure: 100 bars
Space velocity: 1 liter of charge/liter catalyst/h
$H_2$/charge: 1000 m³/m³
Catalyst presulfuration with hydrogen gas + $H_2S$ (3%) at 350° C. for 6 hours under atmospheric pressure.

The charge consists of deasphated oil extracted from Boscan Venezuelian crude oil (DAO from Boscan), having the following characteristics:

| | |
|---|---|
| Density at 20° C. | 0.989 g/cm³ |
| Viscosity at 100° C. | 161 mm²/s |
| Viscosity at 150° C. | 25.3 mm²/s |
| Conradson carbon | 10.3% by weight |
| Insolubles in n-heptane | 0.17% by weight |
| Insolubles in n-pentane | 1.7% by weight |
| Resins precipitated with isopropanol | 10% by weight |
| Total sulfur | 5.16% by weight |
| Total nitrogen | 3990 ppm by weight |
| Nickel | 47 ppm by weight |
| Vanadium | 400 ppm by weight |
| ASTM distillation | |
| initial point | 240° C. |
| 50% point | 550° C. |

During the test, the temperature is successively 360° C., 380° C., 400° C., 420° C., 380° C. (called return temperature). Each temperature step is of 48 hours.

The results are as follows:

TABLE I

| | CATALYST A | | | CATALYST B | | |
|---|---|---|---|---|---|---|
| | Demetal- lation (%) | Dusulfur- ation (%) | Conver- sion of resins (%) | Demetal- lation (%) | Desulfur- ation (%) | Conver- sion of resins (%) |
| T = 360° C. | 76 | 46 | 26 | 79 | 45 | 32 |
| T = 380° C. | 90 | 62 | 41 | 95 | 60 | 55 |
| T = 400° C. | 95 | 76 | 86 | 98 | 76 | 90 |
| T = 420° C. | 98 | 80 | 94 | 99 | 80 | 95 |
| T = 380° C. | 54 | 27 | 29 | 71 | 30 | 46 |

It thus clearly appears that the demetallation rate and the rate of resins conversion are clearly higher with the catalyst used as crushed material. This is particularly true at the return point of 380° C. As a matter of fact, at this point, for both catalysts, the pollution by the metals of the charge (nickel and vanadium) is about 25% by weight (expressed in proportion to the weight of fresh catalyst). Thus, the difference in the demetallation rate and the resins conversion rate clearly shows the higher resistance to metal poisoning of the crushed catalyst.

Catalysts A and B have been examined after the activity test by the Castaing microsonde method (scanning microscopy by reflection), using a Cameca microsonde and the continuous recording method of the nickel and vanadium metal distribution profiles in the catalyst particle at the end of the test.

The catalyst particle has been cut along a plane containing the two larger dimensions of the particle. During the analysis, the sonde was displaced along the direction of one of the two dimensions, thus permitting to characterize the nickel and vanadium deposit in the particles.

Figure 2:
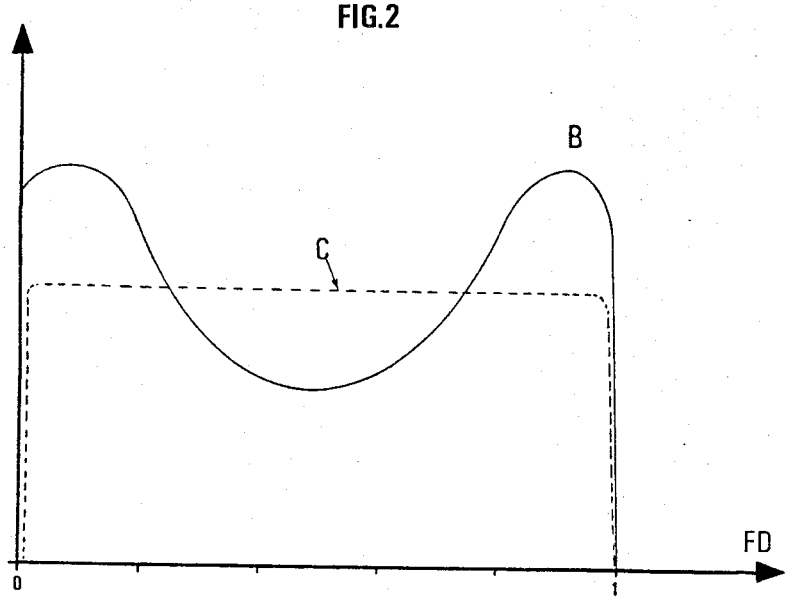
Figure 3:
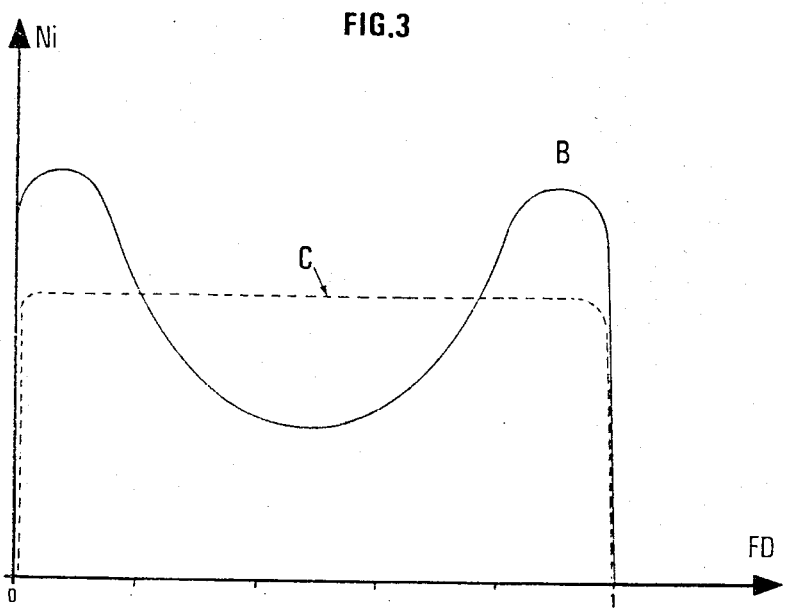

FIGS. 2 and 3 show the results of these analyses. In ordinates, V is the vanadium content and Ni the nickel content (arbitrary units), in abscissae FD is the fraction of the particle diameter. Curve B corresponds to non-crushed extrudates (catalyst A) and curve C to crushed extrudates (catalyst B).

For the non-crushed catalyst, a preferential deposition of metals close to the external surface of the particles is observed, which results in clogging of the catalyst pores. On the contrary, for the crushed catalyst, the nickel and vanadium deposition is uniform in the whole particle.

This comparative example illustrates the difference in activity of catalysts of the same granulometry, the same chemical composition and the same texture (measured by BET and by mercury-pump porosimeter), depending on whether the extrudates are directly prepared at the diameter of use or are prepared at a larger size and then crushed in order to use the fraction of required granulometry. In both cases, metal settles in the particles from the exterior to the interior. The profile of these deposits is very different in these two cases, the shape of the deposit obtained with the crushed material is more advantageous.

EXAMPLE 2

The same two catalysts A and B of example 1 are used in a long run test of hydrotreating DAO from Boscan (same charge as in example 1). The operating conditions are identical to those of example 1, except the temperature which is maintained at 410° C.

It is observed that when the amount of metals (nickel+vanadium) deposited on catalyst A during the test exceeds 40% (40 g of metals for 100 g of fresh catalyst), the demetallation and resin conversion activity falls very quickly practically to zero. When the metal deposit reaches 50%, the demetallation and resin conversion activity is null.

On the contrary, when catalyst B has fixed 50% (with respect to its initial weight) of Ni+V, its demetallation rate is still 55%. Finally, even when the rate of metal captation by the crushed catalyst reaches 120° C., the demetallation rate is still 20% and the resins conversion rate is still 25%. Hence catalyst crushing increases very significantly the specific metal retention.

Used catalysts have been examined by the Castaing microsonde technique as above described. The metal distribution profiles are given in FIG. 4 (M is the total metals weight).

The non-crushed catalyst is crusted over with metals (Ni and V), whereas in the crushed catalyst the metal deposition is homogeneous in the whole particle. This is probably the reason for the very large nickel and vanadium specific retention of this catalyst, higher than 120% by weight with respect to the weight of fresh catalyst.

This comparative example illustrates the substantial improvement in the resistance to deactivation by Ni and V deposition when using crushed materials: a better specifc retention and a better activity after Ni and V captation.

EXAMPLE 3

Two catalysts B and C are prepared.

Catalyst B is the catalyst of example 1. Catalyst C is prepared according to the same process. The difference consists in that the particles of catalyst C are of a smaller size. The size distribution of the particles of catalyst C is from 0.5 mm to 1 mm. This particle size is obtained by more severe crushing (spacing of the rollers: 1 mm in the second step).

The two catalysts are tested in a unit with traversed fixed bed. The catalyst volume is 100 cc. The operating conditions are the same as in example 1, except for the temperature.

The charge is deasphalted oil having the following characteristics:

| | |
|---|---|
| Density at 20° C. | 1.001 g/cm$^3$ |
| Viscosity at 100° C. | 290 mm$^2$/s |
| Viscosity at 150° C. | 33.3 mm$^2$/s |
| Conradson carbon | 11.4% by weight |
| Insolubles in n-heptane | 0.6% by weight |
| Insolubles in n-pentane | 2.5% by weight |
| Resins precipitated with isopropanol | 12% by weight |
| Total nitrogen | 5350 ppm by weight |
| Total sulfur | 3.90% by weight |
| Nickel | 50 ppm by weight |
| Vanadium | 200 ppm by weight |

The reaction temperature is first 360° C. and then 380° C. The demetallation and resin conversion activities are measured for two different poisonings by nickel and vanadium deposition when the temperature is 380° C.

The results are as follows:

TABLE II

| | | CATALYST C | | | CATALYST B | | |
|---|---|---|---|---|---|---|---|
| Temperature (°C.) | Poisoning by Ni + V | Demetallation (%) | Dusulfuration (%) | Conversion of resins (%) | Demetallation (%) | Desulfuration (%) | Conversion of resins (%) |
| 360 | 3% | 92.6 | 66 | 36 | 96.8 | 63.5 | 36 |
| 380 | 6% | 99.5 | 78 | 58 | 99 | 76 | 59 |
| 380 | 20% | 93.5 | 45.4 | 36 | 95 | 44.5 | 35 |

These results thus prove that a reduction of the particle size by more severe crushing does not significantly improve the catalyst activity under the tests conditions.

EXAMPLE 4

Catalysts A and B of example 1 are tested for their activity in the hydrotreatment of an asphaltene-containing crude oil of Venezuelian type.

The operation is conducted in the same unit as in example 3.

The operating conditions are as follows:

| | |
|---|---|
| Space velocity | 0.5 liter charge/liter catalyst/hour |
| Temperature | 420° C. |
| Pressure | 150 bars |

Presulfuration of catalyst identical to that of example 1.

The Venezuelian crude oil charge for the test has the following characteristics:

| | |
|---|---|
| Density at 20° C. | 1.0145 g/cm$^3$ |
| Viscosity at 100° C. | 78 mm$^2$/s |
| Total sulfur | 3.60% by weight |
| Total nitrogen | 6560 ppm by weight |
| Insolubles in n-pentane | 24% by weight |
| Insolubles in n-heptane | 17% by weight |

Resins: insolubles in isopropanol after precipitation of asphaltenes with nC7: 12% by weight.

Catalyst A is completely deactivated when the metals deposit reaches 50% by weight.

On the contrary, catalyst B remains active and its activity has been measured when the deposit of metals (Ni+V) reaches 80% by weight on the catalyst. The following results are obtained:

| | |
|---|---|
| Demetallation | 84% |
| Desulfuration | 52% |
| Conversion of resins | 60% |
| Conversion of asphaltenes | 60% |

The improvements obtained by crushing remain substantial even in the case of a more refractory charge, as here, in the presence not only of resins but also of asphaltenes; a clear advantage for the crushed material is observed.

EXAMPLE 5

Two catalysts D and E have been prepared according to the procedure of example 1. The differences with the catalysts of example 1 consist in that the carrier is silica and the deposited metals are nickel and vanadium. Catalyst D is shaped as extrudates of an average size of 1.5 mm. Catalyst E is formed of crushed particles of an average size from 1 to 2 mm (determined with a set of sieves) with an average size of 1.5 mm. These crushed particles are obtained by crushing extrudates of a 3.5 mm diameter and a 8 mm length.

The composition of the two catalysts is:

| | |
|---|---|
| SiO$_2$ | 91.5% by weight |
| V$_2$O$_5$ | 7.5% by weight |
| NiO | 1.0% by weight |

The two catalysts are tested in a unit with traversed fixed bed. The catalyst volume is 500 cc. The operating conditions are as follows:

| | |
|---|---|
| Total pressure | 120 bars |
| Space velocity | 1 liter of charge/liter of catalyst/hour |
| H2/charge | 1000 m$^3$/m$^3$ |
| Temperature | 380° C. |

Presulfuration of catalyst identical to that of example 1.

The charge is a Boscan crude oil having the following characteristics:

| | |
|---|---|
| Insolubles in n-heptane | 11% by weight |
| Resins precipitated with isopropanol after removal of asphaltenes with nC7 | 10% by weight |
| Sulfur | 4.5% by weight |
| Nickel | 100 ppm by weight |
| Vanadium | 1000 ppm by weight |

The following results are obtained:

TABLE III

| | CATALYST D | | CATALYST E | |
|---|---|---|---|---|
| Demetallation | | Conversion of insolubles in nC7 | Demetallation | Conversion of insolubles in nC7 |
| 76% | | 66% | 82% | 71% |

The measurements are effected when nickel and vanadium of the charge have deposited onto the catalyst in a proportion of 5% by weight with respect to the fresh catalyst.

It is thus apparent that the demetallation power of the crushed silica catalyst is better than that of the silica extrudates catalyst.

EXAMPLE 6

Alumina extrudates are produced, whose characteristics are: total pore volume 48 cc/100 g, surface BET: 320 m²/g, diameter: 1.6 mm, length: 6 mm. The extrudates are prepared from a very pure alumina gel. The carrier is used to prepare a catalyst having the following composition:

| | |
|---|---|
| $MoO_3$ | 14% by weight |
| CoO | 3% by weight |
| $Al_2O_3$ | 83% by weight |

The double impregnation technique is used, according to which molybdenum is first introduced as a solution of ammonium heptamolybdate dissolved in water. The catalyst is dried, calcined at 300° C. and then a second impregnation with an aqueous solution of cobalt nitrate is performed. The catalyst is then dried and calcined at 520° C. in an air stream. Catalyst F is thus obtained.

The same alumina gel as above is used to produce extrudates having the following characteristics: total pore volume: 48 cc/100 g, surface BET: 320 m²/g, diameter: 4 mm. The extrudates are then crushed to particles of an average size of 1.5 mm (the limit sizes being 1 mm and 2 mm). A catalyst is then prepared according to the same procedure as for catalyst F. Catalyst G is thus obtained.

80 cc of catalysts F and G are charged in a pilot plant fed with an Aramco vacuum distillate.

The characteristics of this oil fraction are as follows:

| | |
|---|---|
| Density at 20° C. g/cm₃ | 0.906 |
| Viscosity at 100° C. mm²/s | 11.8 |
| Sulfur in % by weight | 2.53 |
| Total nitrogen in ppm by weight | 1500 |
| ASTM D 1160 distillation (°C.) | |
| IP | 350 |
| 10% | 455 |
| 50% | 487 |
| 90% | 523 |

The tests are effected after presulfuration of the catalysts for 6 hours with a mixture of 3% by volume of hydrogen sulfide with 97% by volume of hydrogen at 45 bars and 350° C. (flow rate: 100N liters/hour).

The test is effected in the following conditions:

| | |
|---|---|
| Total pressure | 45 bars |
| Hydrogen/hydrocarbon | 350 |
| ratio in liters/liter | |
| VVH in liters of distillate/ per liter of catalyst and per hour | 1.33 |

The desulfuration results, after 60 hours of operation, are as follows (% desulfuration):

| | |
|---|---|
| Catalyst F (extrudates) | 88.3% |
| Catalyst G (crushed) | 92% |

The improvement resulting from the crushing of autoclaved extrudates (example 1) is also observed in the present example for the non-autoclaved extrudates and the activity improvement is substantial when the charge to be treated is a distillate.

EXAMPLE 7

Crushed extrudates of alumina carrier (before crushing: diameter of 5 mm and length of 10 mm), from which the fraction of particle size from 1 to 2 mm has been selected, are used to prepare catalysts according to the technique of example 1.

The starting carrier had the following texture Tpv: 110 cc/100 g Surface BET: 100 m²/g

| Composition Catalyst | H | I | J | K |
|---|---|---|---|---|
| Composition By weight | CoO:1.5% $MoO_3$:7% $Al_2O_3$:91.5% | $Fe_2O_3$:4% $Al_2O_3$:96% 91.5% | NiO:4% $Al_2O_3$:96% | $V_2O_5$:4.4% $Al_2O_3$:95.6% |

The catalytic properties of these catalysts are controlled by using the same charge and operating conditions as in example 1: pressure 100 bars, VVH=1, variable temperature.

The results are as follows:

TABLE IV

| | T = 380° C. | | T = 400° C. | | T = 420° C. | |
|---|---|---|---|---|---|---|
| CATALYST | HDS | HDM | HDS | HDM | HDS | HDM |
| H | 55% | 84% | 71% | 95% | 83% | 98% |
| I | 10% | 58% | 29% | 86% | 51% | 96% |
| J | 15% | 75% | 36% | 90% | 53% | 96% |
| K | 22% | 78% | 59% | 96% | 72% | 98% |

It is observed that all the catalysts give good demetallation results at 400° C. and above.

The above examples show the high activity of the catalysts according to the invention.

As above mentioned, the rough crushing according to the invention, keeps substantially unchanged the structural characteristics of the carriers and the catalysts, particularly their apparent density and their pore distribution, in contrast with the crushing to small particles of 10 micrometers or less, which results in an undesirable modification of said characteristics.

What is claimed as the invention is:

1. A process for manufacturing a catalyst consisting essentially of at least one alumina, silica or silica-alumina carrier and at least one active element selected from vanadium and the metals of groups VI and VIII and compounds of said metals, said process comprising the steps of shaping said carrier as extrudates, calcining said extrudates at about 300°–1000° C., coarsely crushing said calcined extrudates and recovering resultant crushed particles of average size from 0.05 to 0.5 times the diameter of said calcined extrudates, introducing said at least one active element into said recovered crushed particles, and calcining resultant catalyst particles at about 300°–1000° C.

2. A process according to claim 1, wherein the crushing is performed on carrier extrudates, before incorporation of all of the active elements.

3. A process according to claim 1, wherein said catalyst carrier is alumina and said at least one metal or compound of a metal is molybdenum, tungsten, vanadium, nickel, cobalt, iron or a compound thereof.

4. A process according to claim 1, wherein the extrudates subjected to crushing have a diameter of from 4 to 10 mm and the recovered particles have an average size of from 0.5 to 4 mm.

5. A process according to claim 1, wherein the crushing is performed in two successive steps, the spacing between the crushing surfaces being, in the first step, substantially equal to the diameter of the initial extrudates and, in the second step, substantially equal to the maximum size of the desired particles.

6. A process according to claim 1, wherein said carrier is alumina in the form of conglomerates of acicular plates, the plates of each conglomerate being generally radially oriented with respect to one another and with respect to the center of the conglomerate, and forming a major proportion of wedge-shaped mesopores.

7. A process according to claim 4, wherein said recovered particles have an average size of from 0.8 to 2 mm.

8. A process according to claim 1, wherein after the first calcining step and before the crushing step, the extrudates are autoclaved.

9. A catalyst produced by the process of any of claims 3–7 or 1 and 8.

* * * * *